(12) United States Patent
Kim

(10) Patent No.: US 6,742,888 B1
(45) Date of Patent: Jun. 1, 2004

(54) SUNGLASS CLIPPED EYEGLASS SET

(76) Inventor: Jong Kim, 2641 W. Olympic Blvd., Los Angeles, CA (US) 90006

( * ) Notice: Subject to any disclaimer, the term of this patent is extended or adjusted under 35 U.S.C. 154(b) by 0 days.

(21) Appl. No.: 10/377,549

(22) Filed: Mar. 3, 2003

(51) Int. Cl.[7] ................................. G02C 9/00

(52) U.S. Cl. .......................... 351/47; 351/57

(58) Field of Search ...................... 351/47, 48, 57, 351/58, 44, 41, 158

(56) References Cited

U.S. PATENT DOCUMENTS 6,293,671 B1 * 9/2001 Masunaga .................. 351/47

* cited by examiner

Primary Examiner—Hung X. Dang
(74) Attorney, Agent, or Firm—Park & Sutton LLP; John K. Park

(57) ABSTRACT

An eyeglass system comprises a base eyeglass set and a cover eyeglass set being carried on the base eyeglass set. The base set includes base lenses and a base bridge connecting the base lenses and hooks connected to outer sides of the base lenses. The cover set includes cover lenses, cover lenses and a cover bridge connecting the cover lenses. Inner portions of the cover lenses are recessed to form inner openings so that each corresponding end of the base bridge is inserted in the inner opening.

23 Claims, 4 Drawing Sheets

SUNGLASS CLIPPED EYEGLASS SET

BACKGROUND OF THE INVENTION

The present invention relates to eyeglasses with a sunglass clip. More particularly, the present invention relates to an eyeglass system incorporated by a pair of base eyeglasses and a pair of cover clips serving as sunglasses where the sunglass clips are detachably inserted on bridges and temple tips of the base eyeglasses.

Conventional eyeglasses with a sunglass clip show attachments around rims of the clip to become attached to the base eyeglasses. Although such attachments provide convenience in terms of dual usage without a separate sunglass set, the sunglass clip mechanism hardly reflects sys health requirements. Because the sunglass clip covering the base glasses is inevitably spaced apart from the base glasses, the user has to suffer dual reflection while using the sunglass clip, thus increasing fatigue of the user's eyes.

Another disadvantage of the conventional eyeglasses having a sunglass clip is that the sunglass clip is noticeable due to the attachments and the substantial gap between the base glasses and the cover glasses. One of the lease welcome factors of the conventional eyeglasses having a sunglass clip would be difficulty applying fashion design to such eyeglass product, because of limitation caused by attachments and separate product from the base glasses.

SUMMARY OF THE INVENTION

The present invention is contrived to overcome the conventional disadvantages. Accordingly, it is an objective of the present invention to provide an eyeglass system that enables detachable hooking of a cover glass set on a base glass set using bridges and temple tips thereof. Another objective is to provide an eyeglass system that maximizes adaptability of a cover sunglass set to rimless base eyeglasses. Further objective is to provide an eyeglass system that facilitates custom design while improving comfortability when wearing the system.

To achieve these and other objectives, the eyeglass system according to the present invention comprises first and second base lenses each having an inner portion and an outer portion. A base bridge having first and second ends, wherein the base bridge first end is attached to the first base lens inner portion and the base bridge second end is attached to the second base lens inner portion. The first and second ends of the base bridge attached to the bas lenses are each outwardly protruded above a corresponding outer surface each base lens inner portion.

First and second hooks each have an eye side end and a temple side end. The first hook eye side end is attached to the first base lens outer portion and the second hook eye side ends are each outwardly protruded above a corresponding outer surface of each base lens outer portion. Here, the base lenses, the base bridge and the hooks from a base eyeglass set. First and second cover lens each have an inner portion and an outer portion. The cover lenses are connected to each other via a cover bridge whose ends are attached to the inner portions thereof. An inner opening is formed adjacent to each inner portion of the cover lenses to carry therein the corresponding end of the base bridge, and an outer opening is formed in each outer portion of the cover lenses to carry therein the corresponding eye side end of the hooks, by allowing the inner openings to become inserted by the base bridge ends and the outer openings to become inserted by the eye side ends of the hooks.

In a better version, first and second supports each having an inner end and an outer end, wherein the support inner ends are correspondingly attached to the cover lenses adjacent to the outer openings, whereby when the cover lenses are carried on the base lenses the support outer ends and the hook eye side ends mutually support each other and when detaching from the base lenses the cover lenses connected by the cover bridge the support outer ends serve as handles being held by a user. Preferably, the cover bridge is magnetized to the base bridge and the hooks are magnetized to the supports.

Advantages of the present invention are numerous in that: (1) the cover lenses serving as detachable sunglasses reserve openings though side end portions thereof as a tool so as to allow the cover lenses to become precisely inserted on the base lenses when needed by a user, whereby the eyeglass system would look as regular sunglasses and maximizes the user's satisfaction; (2) the eyeglass system facilitates custom design for the base and cover lenses by adopting a highly flexible and chemical resistant polyamide material, thereby improving adaptability and satisfying user's fashion demand; and (3) elastic characteristics are applied to contacts especially between the cover bridges and the cover lenses and to the supports and hooks serving as temple tips for the eyeglass system, thereby improving product reliability and comfortability.

Although the present invention is briefly summarized, the full understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE PREFERRED EMBODIMENTS

Figure 1:
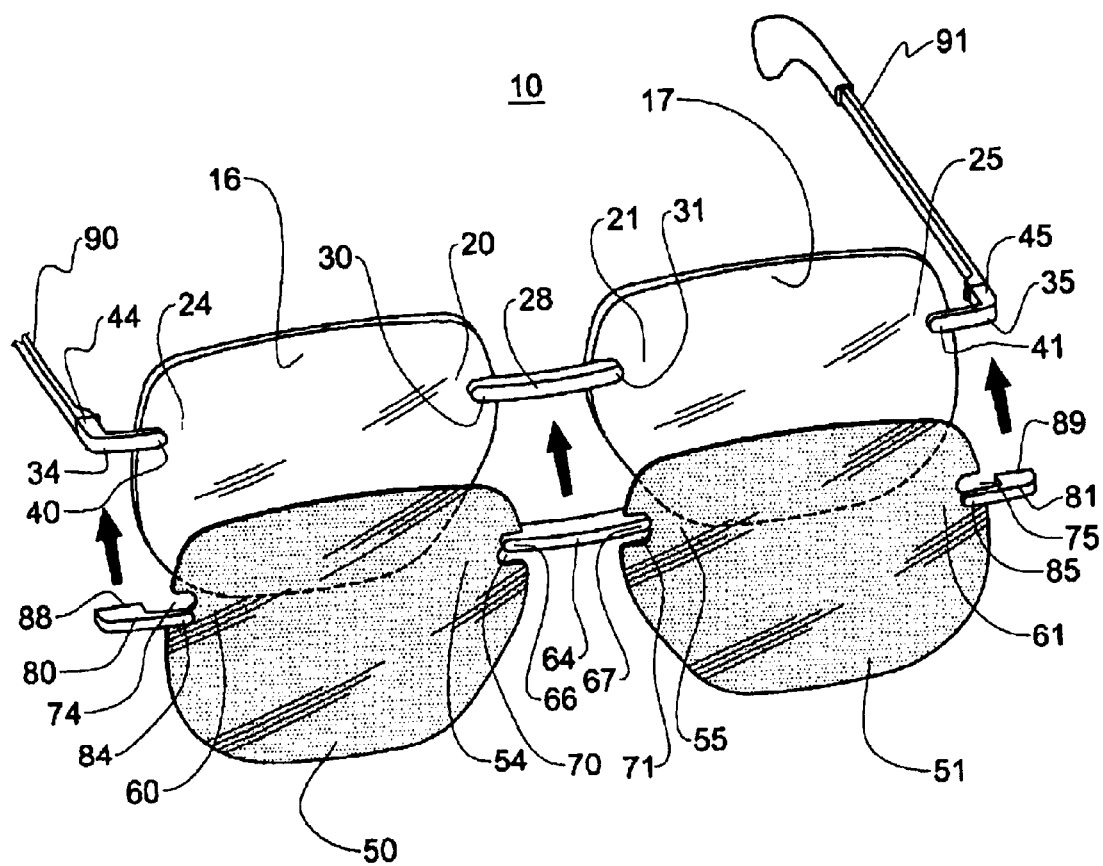
FIGS. 1 and 2 are perspective views each showing detachable attachment mechanism of an eyeglass system according to a preferred embodiment of the present invention.
Figure 2:
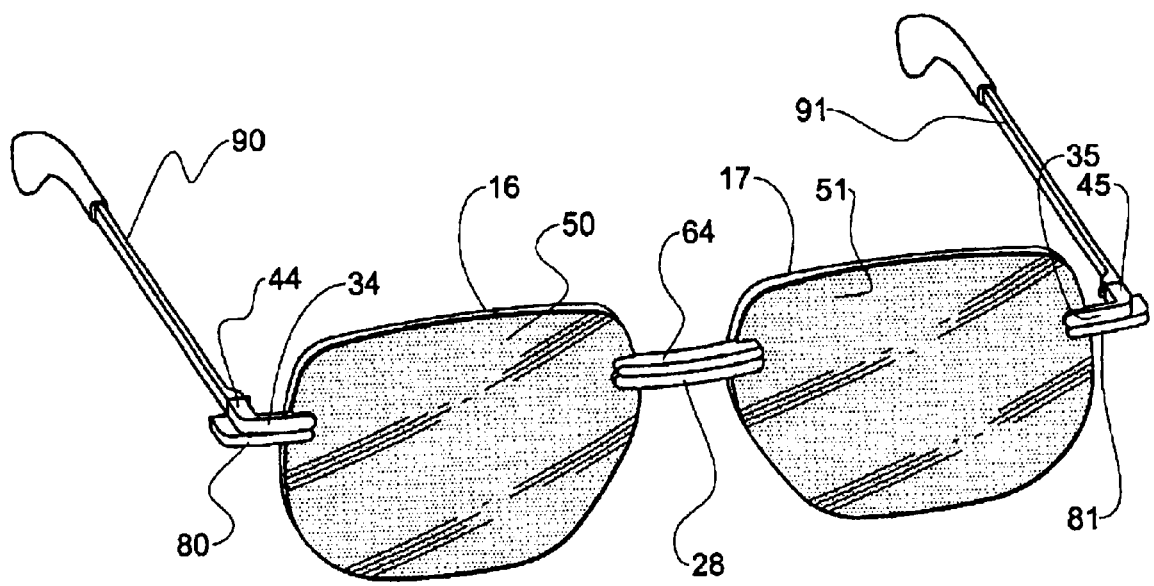

FIG. 1 shows an eyeglass system 10 according to the present invention where a base glass set 12 is having a cover glass set 14 thereon. Here, the cover glass set 14 serves as sunglasses. FIG. 2 shows an attachment mechanism of the base glass set 12 and the cover glass set 14 where the cover glass set 14 is fittingly worn over and on the base glass set 12. As shown therein, it is preferred that the cover glass set 14 is paired in lens size to the base glass set 12.

In a preferred embodiment, the base glass set 12 includes first and second base lenses 16, 17 respectively having inner portions 20, 21 and outer portion 24, 25. Each lens 16, 17 of the base glass set 12 is linked via a base bridge 28 to each other. The base bridge 28 has first and second ends 30, 31 so that the base bridge first end 30 is attached to the first base lens inner portion 20 whereas the base bridge second end 31 is attached to the second base lens inner portion 21.

The base bridge 28 are provided such that the first and second ends 30, 31 of the base bridge 28 are each outwardly protruded above a corresponding outer surface of said each base lens inner portion 20, 21 so as to facilitate detachable attachment between the base and cover glass sets 12, 14.

Further provided are first and second hooks 34, 35 opposing the base bridge 28. The first and second hooks 34, 35 respectively have eye side ends 40, 41 and temple side ends 44, 45. Here, the first hook eye side end 40 is attached to the first base lens outer portion 24 whereas the second hook eye side end 41 is attached to the second base lens outer portion 25. In order to further facilitate the detachable attachment between the base and cover glass sets 12, 14, the first and second hook eye side ends 40, 41 are each outwardly protruded above a corresponding outer surface of each base lens outer portion 24, 25. In this construction, the base lenses 16, 17, the base bridge 28 and the hooks 34, 35 are collectively provided to form the base eyeglass set 12.

Meanwhile, the cover glass set 14 includes first and second cover lenses 50, 51 each having an inner portion 54, 55 and an outer portion 60, 61. The cover lenses 50, 51 are connected to each other via a cover bridge 64 whose ends 66, 67 are attached to the inner portions 54, 55 thereof. In this mechanism, inner openings 70, 71 are formed adjacent to the inner portions 54, 55 of the cover lenses 50, 51 to carry therein corresponding ends 30, 31 of the base bridge 28 of the base glass set 12. That is, the cover lenses 50, 51 are substantially recessed to form the inner openings 70, 71.

For a better performance, outer openings 74, 75 are formed in outer portions 60, 61 of the cover lenses 50, 51 to carry therein the corresponding eye side ends 40, 41 of the hooks 34, 35 of the base glass set 12. The cover lenses 50, 51 are formed of a polyamide material which reserves highly flexibly and light weight characteristics. Preferably, the cover lenses 50, 51 are formed of a micro-crystalline polyamide (MCP).

As shown back in FIG. 2, the cover lenses 50, 51 connected to each other via the cover bridge 64 are detachably carried on the base lenses 16, 17, by allowing the inner openings 70, 71 to become inserted by the base bridge ends 30, 31 and the outer openings 74, 75 to become inserted by the eye side ends 40, 41 of the hooks 34, 35 of the base glass set 12.

Preferably, the cover bridge 64 may be aligned above the inner openings 70, 71. The cover lenses 50, 51 may be substantially colored, and the substantially colored cover lenses 50, 51 are darker in color than the base lenses 16, 17 of the base glass set 12. Also, it is recommended that the cover lenses 50, 51 are formed to become substantially identical to the base lenses 16, 17 in lens surface curvature. The cover lenses 50, 51 may be formed thinner than the base lenses 16, 17.

On the other hand, the cover bridge 64 is formed to substantially cover the base bridge 28 when the cover lenses 50, 51 supported by the cover bridge 64 therebetween are carried over and on the base lenses 16, 17 so as to improve stability in the detachable attachment of the base and cover glass sets 12, 14. In order to further improve stability in the detachable attachment characteristic. the cover bridge 64 may be magnetized to the base bridge 28.

In another embodiment, the cover glass set 14 further includes first and second supports 80, 81 each having an inner end 84, 85 and an outer end 88, 89. The support inner ends 84, 85 are correspondingly attached to the cover lenses 50, 51 adjacent to the outer openings 74, 75. In this mechanism, when the cover lenses 50, 51 are carried on the base lenses 16, 17, the support inner ends 84, 85 and the hook eye side ends 40, 41 mutually support each other, and when detaching from the base lenses 16, 17 the cover lenses 50, 51 connected by the cover bridge 64, the support outer ends 88, 89 serve as handles being held by a user.

Figure 3:
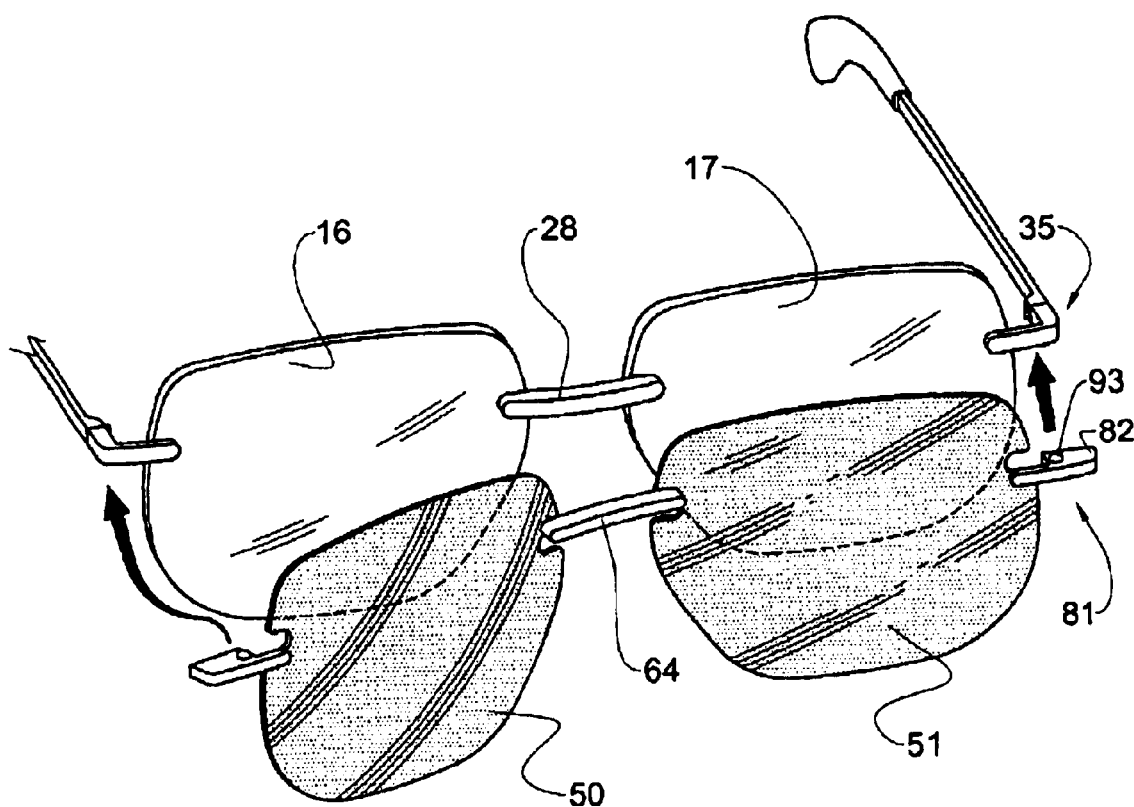
FIG. 3 is a perspective view showing elastic mechanism of the eyeglass system according to the present invention.
Figure 4:
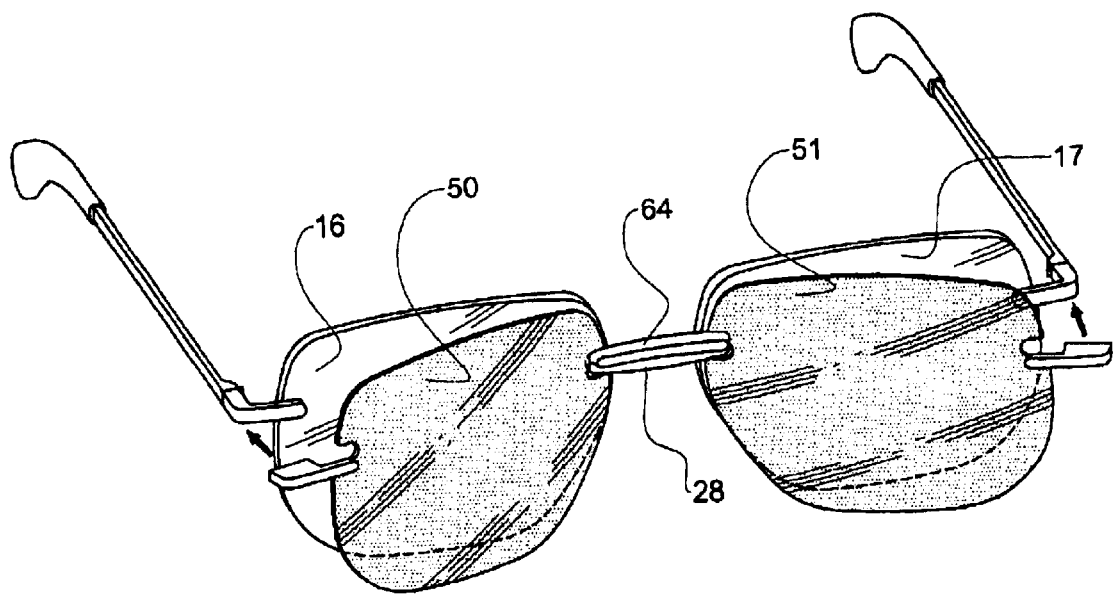
FIG. 4 is a perspective view showing an eyeglass system according to another embodiment of the present invention.

FIG. 3 illustrates elasticity adopted to the cover glass set 14, and FIG. 4 illustrates magnetism applied to the base and cover bridges 28, 64. As shown therein, the cover bridge 64 is elastically attached to the cover lenses 50, 51 so as to minimize tension between the cover bridge 64 and the cover lenses 50, 51, thereby improving product reliability. In a better mode, the cover bridge 64 is aligned above the inner openings 70, 71 and the supports 80, 81 are aligned below the outer openings 74, 75. Selectively, the cover bridge 64 may be aligned below the inner openings 70, 71 and the supports 80, 81 are aligned above the outer openings 74, 75. Also the hooks 34, 35 may be magnetized to the supports 80, 81 in a corresponding manner. As shown back in FIG. 2, first and second legs 90, 91 may be provided as detachable extensions from the temple side ends 44, 45 of the hooks 34, 35.

As further shown in the partial enlargement view of FIG. 3, a boss 93 may be provided to upwardly extend from an upper surface 82 of each support 81 to stay hooked by the hooks 35 when the cover eyeglass set 14 is carried on the base eyeglass set 12. Here, the boss 93 of each support 81 is elastically snapped from outside into inside of the hooks 35 when the cover eyeglass set 14 is carried on the base eyeglass set 12.

As discussed above, an advantage of the present invention is that the cover lenses 50, 51 serving as detachable sunglasses reserve openings 70, 71, 74, 75 formed through side end portions 54, 55, 60, 61 thereof as a tool so as to allow the cover lenses 50, 51 to become precisely inserted on the base lenses 16, 17 when needed by a user, whereby the eyeglass system 10 would look as regular sunglasses and maximizes the user's satisfaction.

Further, the eyeglass system 10 facilitates custom design for the base and cover lenses 16, 17, 50, 51, by adopting a highly flexible and chemical resistant polyamide material, thereby improving adaptability and satisfying user's fashion demand. In addition, elastic characteristics are applied to contacts especially between the cover bridge 64 and the cover lenses 50, 51 and to the supports 80, 81 and hooks 34, 35 serving as temple tips for the eyeglass system 10, thereby improving product reliability and comfortability.

Although the invention has been described in considerable detail with reference to certain preferred versions thereof, other versions are possible by converting the aforementioned construction. Therefore, the scope of the invention shall not be limited by the specification specified above and the appended claims.

What is claimed is:

1. A sunglass clipped eyeglass set, comprising:
   a) first and second base lenses each having an inner portion and an outer portion;
   b) a base bridge having first and second ends, wherein the base bridge first end is attached to the first base lens inner portion and the base bridge second end is attached to the second base lens inner portion, wherein the first and second ends of the base bridge attached to the base lenses are each outwardly protruded above a corresponding outer surface or said each base lens inner portion;
   c) first and second hooks each having an eye side end and a temple side end, wherein the first book eye side end is attached to the first base lens outer portion and the second hook eye side end is attached to the second base lens outer portion, wherein the first and second hook eye side ends are each outwardly protruded above a corresponding outer surface of said each base lens outer portion, wherein the base lenses, the base bridge and the hooks form a base eyeglass set; and d) first and second cover lenses each having an inner portion and an outer portion, wherein the cover lenses are connected to each other via a cover bridge whose ends are attached to the inner portions thereof, wherein the inner portions of the cover lenses are respectively recessed to form an inner opening so that the corresponding inner end of the base bridge is inserted in the inner opening, wherein the outer portions of the cover lenses are respectively recess d to form an outer opening so that the corresponding outer end of the hooks is inserted in the outer opening, wherein the cover lenses connected to each other via the cover bridge are detachably carried on the base lenses, by allowing the inner openings to become inserted by the base bridge ends and the outer openings to become inserted by the eye side ends of the hooks.

2. The eyeglass system of claim 1 wherein the cover bridge is aligned above the inner openings.

3. The eyeglass system of claim 1 wherein the cover lenses are substantially colored, wherein the substantially colored cover lenses are darker in color than the base lenses.

4. The eyeglass system of claim 1 wherein the cover lenses are substantially identical to the base lenses in lens surface curvature.

5. The eyeglass system of claim 1 wherein the cover lenses are formed of a polyamide material.

6. The eyeglass system of claim 1 wherein the cover bridge substantially covers the base bridge when the cover lenses supported by the cover bridge therebetween are carried over and on the base lenses.

7. The eyeglass system of claim 1 wherein the cover bridge is magnetized to the base bridge.

8. A sunglass clipped eyeglass set, comprising:

a) first and second base lenses each having an inner portion and an outer portion;

b) a base bridge having first and second ends, wherein the base bridge first end is attached to the first base lens inner portion and the base bridge second end is attached to the second base lens inner portion, wherein the first and second ends of the base bridge attached to the base lenses are each outwardly protruded above a corresponding outer surface of said each base lens inner portion;

c) first and second hooks each having an eye side end and a temple side end, wherein the first hook eye side end is attached to the first base lens outer portion and the second hook eye side end is attached to the second base lens outer portion, wherein the first and second hook eye side ends are each outwardly protruded above a corresponding outer surface of said each base lens outer portion, wherein the base lenses, the base bridge and the hooks form a base eyeglass set;

d) first and second cover lenses each having an inner portion and an outer portion, wherein the cover lenses are connected to each other via a cover bridge whose ends are attached to the inner portions thereof, wherein the inner portions of the cover lenses are respectively recessed to form an inner opening so that the corresponding inner end of the base bridge is inserted in the inner opening, wherein the outer portions of the cover lenses are respectively recessed to form an outer opening so that the corresponding outer end of the hooks is inserted in the outer opening, wherein the cover lenses connected to each other via the cover bridge are detachably carried over and on the base lenses, by allowing the inner openings to become inserted by the base bridge ends and the outer openings to become inserted by the eye side ends of the hooks;

e) first and second supports each having an inner end and an outer end, wherein the support inner ends are correspondingly attached to the cover lenses adjacent to the outer openings, wherein when the cover lenses are carried over and on the base lenses the eye side ends of the hooks become inserted in the outer openings of the cover lenses while the support inner ends become hooked on the eye side ends of the hooks, wherein the support outer ends serve as handles being held by a user when detaching from the base lenses the cover lenses connected by the cover bridge.

9. The eyeglass system of claim 8 wherein the cover bridge is aligned above the inner openings and the supports are aligned below the outer openings.

10. The eyeglass system of claim 9 wherein the cover bridge substantially covers the base bridge when the cover lenses supported by the cover bridge therebetween are carried over and on the base lenses.

11. The eyeglass system of claim 8 wherein the cover bridge is aligned below the inner openings and the supports are aligned above the outer openings.

12. The eyeglass system of claim 8 wherein the cover lenses are substantially colored, wherein the substantially colored cover lenses are darker in color than the base lenses.

13. The eyeglass system of claim 8 wherein the cover lenses are substantially identical to the base lenses in lens surface curvature.

14. The eyeglass system of claim 8 wherein the cover lenses are formed of a polyamide material.

15. The eyeglass system of claim 8 wherein the cover bridge is magnetized to the base bridge.

16. The eyeglass system of claim 8 wherein the hooks are magnetized to the supports.

17. The eyeglass system of claim 8 wherein the cover bridge is magnetized to the base bridge and the hooks are magnetized to the supports.

18. A sunglass clipped eyeglass set, comprising:

a) a base eyeglass set having first and second base lenses, a base bridge connecting the base lenses, first and second hooks having eyes side ends and temple side ends, first and second legs extending from the hook temple side ends, wherein the hook eye side ends are correspondingly attached to outer portions of the base lenses, wherein each end of the base bridge and each eye side end of the hooks are outwardly protruded above a corresponding outer surface of said each base lens; and b) a cover eyeglass set having first and second cover lenses, a cover bridge connecting the cover lenses, first and second supports having inner and outer ends, wherein the inner ends of the supports are correspondingly attached to outer portions of the cover lenses, wherein the cover lenses are each recessed from an inner end portion thereof to form an inner opening below each corresponding attachment of the cover bridge and the cover lenses, wherein the outer portions of the cover lenses are each recessed to form an outer opening above each corresponding attachment of the supports and the cover lenses, wherein the cover lenses connected to each other via the cover bridge are detachably carried over and on the base lenses, by allowing the inner openings to become inserted by the base bridge ends and the outer openings to become inserted by the eye side ends of the hooks, wherein when the cover lenses are carried over and on the base lenses the eye side ends of the hooks become inserted in the outer openings of the cover lenses while the support inner ends become hooked on the eye side ends of the hooks, wherein the support outer ends serve as handles being held by a user when detaching from the base lenses the cover lenses connected by the cover bridge; and c) a boss upwardly extending from an upper surface of said each support to stay hooked by the hooks when the cover eyeglass set is carried on the base eyeglass set.

19. The eyeglass system of claim 18 wherein the boss of said each supports is elastically snapped from outside into inside of the hooks when the cover eyeglass set is carried on the base eyeglass set.

20. The eyeglass system of claim 18 wherein the cover lenses are each recessed from an outer end portion thereof to form an outer opening above each corresponding attachment of the supports and the cover lenses.

21. The eyeglass system of claim 18 wherein the cover lenses are substantially identical to the base lenses in lens surface curvature.

22. The eyeglass system of claim 18 wherein the cover lenses are formed of a polyamide material.

23. The eyeglass system of claim 18 wherein the cover bridge is magnetized to the base bridge.

* * * * *